US012431662B2

(12) United States Patent
Schöps et al.

(10) Patent No.: US 12,431,662 B2
(45) Date of Patent: Sep. 30, 2025

(54) SHIELDING ELEMENT AND PLUG CONNECTOR

(71) Applicants: FEP FAHRZEUGELEKTRIK PIRNA GMBH & CO. KG, Pirna (DE); HANON SYSTEMS, Daejeon (KR)

(72) Inventors: Anke Schöps, Pirna (DE); Christian Höhn, Dresden (DE); Bernd Lucius, Bad Gottleuba-Berggiesshügel (DE); Oliver Gormanns, Mönchengladbach (DE); Eric Rooks, Leichlingen (DE)

(73) Assignees: FEP Fahrzeug Electrik Pira GmbH & Co KG, Pima (DE); Hanon Systems, Daejeon (KR)

( * ) Notice: Subject to any disclaimer, the term of this patent is extended or adjusted under 35 U.S.C. 154(b) by 355 days.

(21) Appl. No.: 17/924,572

(22) PCT Filed: May 11, 2020

(86) PCT No.: PCT/DE2020/100398
§ 371 (c)(1),
(2) Date: Nov. 10, 2022

(87) PCT Pub. No.: WO2021/228294
PCT Pub. Date: Nov. 18, 2021

(65) Prior Publication Data

US 2023/0187873 A1 Jun. 15, 2023

(51) Int. Cl.
*H01R 13/52* (2006.01)
*H01R 13/6582* (2011.01)
(Continued)

(52) U.S. Cl.
CPC ..... *H01R 13/5202* (2013.01); *H01R 13/6582* (2013.01); *H01R 13/6596* (2013.01);
(Continued)

(58) Field of Classification Search
CPC ............ H01R 13/5202; H01R 13/6582; H01R 13/6596; H01R 13/52; H01R 13/646;
(Continued)

(56) References Cited

U.S. PATENT DOCUMENTS 11,710,932 B2 * 7/2023 Listing .............. H01R 13/6583 439/607.19
2014/0213089 A1 7/2014 Ueberschlag

FOREIGN PATENT DOCUMENTS

AU 2015100481 A1 5/2015
CH 660 934 5/1987
(Continued)

OTHER PUBLICATIONS

International Search Report issued by the European Patent Office in International Application PCT/DE2020/100398 on Jan. 22, 2021.
(Continued)

*Primary Examiner* — Justin M Kratt
(74) *Attorney, Agent, or Firm* — Ursula B. Day, Esq.

(57) ABSTRACT

A shielding element and a plug connector providing reliable shielding as well as reduced assembly effort and assembly and savings on material, weight and material costs. Inner spring elements are arranged at a first end of a hollow cylindrical main body and configured to establish electrical contact with a shielding of a mating connector The shielding element furthermore has a plurality of tabs arranged along the circumference of a hollow cylindrical main body at a second end of the hollow cylindrical main body, wherein the tabs are bent and project at least in part radially from a longitudinal axis of the hollow cylindrical main body.

8 Claims, 7 Drawing Sheets

(51) Int. Cl.

| | |
|---|---|
| ***H01R 13/6596*** | (2011.01) |
| *H01R 13/646* | (2011.01) |
| *H01R 13/648* | (2006.01) |
| *H01R 13/658* | (2011.01) |
| *H01R 13/6581* | (2011.01) |
| *H01R 13/6591* | (2011.01) |

(52) U.S. Cl.
CPC ............ *H01R 13/52* (2013.01); *H01R 13/646* (2013.01); *H01R 13/648* (2013.01); *H01R 13/658* (2013.01); *H01R 13/6581* (2013.01); *H01R 13/6591* (2013.01)

(58) Field of Classification Search
CPC ................ H01R 13/648; H01R 13/658; H01R 13/6581; H01R 13/6591
See application file for complete search history.

(56) References Cited

FOREIGN PATENT DOCUMENTS

| | | | | |
|---|---|---|---|---|
| CN | 102170074 | A | 8/2011 | |
| DE | 4212007 | A1 * | 10/1993 | ....... H01R 13/65802 |
| DE | 19815488 | | 3/2000 | |
| DE | 202012000421 | | 4/2012 | |
| DE | 10 2015226034 | | 6/2016 | |
| WO | WO 97/50154 | | 12/1997 | |
| WO | WO 9750154 | A1 | 12/1997 | |
| WO | WO 2011/097007 | | 8/2011 | |

OTHER PUBLICATIONS

Chinese Search Report issued on Feb. 28, 2025 with respect to counterpart Chinese patent application 202080100807.6.
Translation of Chinese Search Report issued on Feb. 28, 2025 with respect to counterpart Chinese patent application 202080100807.6.

* cited by examiner

SHIELDING ELEMENT AND PLUG CONNECTOR

CROSS-REFERENCES TO RELATED APPLICATIONS

This application is the U.S. National Stage of International Application No. PCT/DE2020/100398, filed May 11, 2020, which designated the United States and has been published as International Publication No. WO 2021/228294 A1, pursuant to 35 U.S.C. 119 (a)-(d).

BACKGROUND OF THE INVENTION

The invention relates to a shielding element which has a hollow-cylindrical base body and at a first end of the hollow-cylindrical base body internal spring elements for establishing electrical contact with a shielding of a mating connector, and which is electrically conductively connected with a second end of the hollow-cylindrical base body to a housing of an electrical assembly.

The invention also relates to a plug connector which is arranged with a mating connector to form a plug connection.

The invention relates in particular to a shielding element that is arranged in a plug connection used to establish electrical connections to assemblies in vehicles. Here, such connections are made both to so-called main units and to so-called ancillary units in vehicles.

In the field of motor vehicle technology, a distinction is made between main units and auxiliary units. While a main unit enables a vehicle to move, all those supplementary machines of a vehicle that cannot directly cause a vehicle to move are referred to as auxiliary units. Examples of such auxiliary units are a starter, an alternator, an air conditioning compressor, an auxiliary heater, a lubricant pump, a hydraulic pump, a cooling water pump, a fuel pump, a brake booster or an auxiliary power unit.

Plug connections of this type are required, for example, to transmit an operating voltage, to transmit signals for controlling or regulating assemblies, and/or to transmit status information within a vehicle.

For example, when used in hybrid or electric vehicles, electrical connections need to be established between voltage sources such as a battery or a generator and loads, for example a main assembly such as an electric motor.

These electrical connections should be designed as detachable connections, which is typically implemented by a plug connection. In addition, an electrical connection and a continuous shielding should be provided between a shielding of a cable and a housing of a main or auxiliary unit, such as a generator or an electric motor.

Such shielding is required to protect other vehicle assemblies, for example control assemblies such as a control unit (ECU; electronic control unit) against interference and to avoid emitting interference that could impair proper operation.

Such plug connectors are used in particular in the area of cables or wiring in so-called high-voltage vehicle electrical systems, which are required, for example, to supply power in hybrid or electric vehicles, with voltages in the range between 300 V and 800 V being used in this high-voltage range, for example. In this voltage range in particular, shielding measures are required in order, for example, to minimize interference with a vehicle electrical system operating in the low-voltage range of 12 V or 24 V.

In this case, a shielding element arranged in a plug connection must, on the one hand, provide a detachable connection and, on the other hand, enable a secure, robust electrical connection both to the housing of a main or auxiliary unit and to the shielding of the high-voltage cable. A secure and robust connection is to be understood as an electrical connection that is kept intact over its service life while exposed to vibrations or shocks due to the usual, harsh environmental conditions in a vehicle.

DE 20 2012 000 421 U1 discloses a shielding connection, with a shielded connector comprising a housing having an interior shielding element for connection to a shielded cable. In particular, the housing is designed as a housing angled at an angle.

The object to be solved is to provide a plug connector that enables an optimal shield connection between a cable and a connector.

According to the solution, the shielding element can be connected by a damping ring of the housing directly to a braided shield of a shield folded back around a cable, and a shield transfer element is arranged in the housing for direct connection to the braided shield of the shield.

DE 10 2015 226 034 A1 discloses a connector carrier made of plastic on the device with a metal sleeve for the purpose of shielding.

The problem to be solved is that a generic shield contact element is to be improved by improving the functional assembly while maintaining the required shielding effect.

This problem is solved by constructing the spring elements as external spring elements arranged at one end of the hollow-cylindrical base body for making contact with the electrical device and as inner spring elements arranged at the other end of the hollow-cylindrical base body for making contact with the shielding of the cable.

With this configuration of the shield contact element, the internal spring elements are advantageously no longer arranged facing outward, i.e. outside the outer surface of the hollow-cylindrical base body or protruding therefrom, thus effectively preventing bending.

In a further development, the hollow-cylindrical base body may have at one end on the circumference a plurality of recesses, into which the external spring elements are inserted. These recesses make it possible for a partial area of the external spring elements to protrude beyond the outer surface of the hollow-cylindrical base body, while the remaining areas, in particular the adjacent of the area of the spring element that protrude beyond the surface, are arranged on the base body.

Connections for shielding in plug connections, both in mating connectors as in plug and socket assemblies as well as in connectors having a socket are known from the prior art. These conventional solutions have a significant disadvantage in that several individual parts are required for such shields both in connectors and in mating connectors. Such multi-part solutions result, on the one hand, in an increased assembly complexity and thus in higher assembly costs. On the other hand, such multi-part solutions are more material-intensive and thus increase the weight of a connector.

Based on this prior art, there is a need for an improved shielding element.

It is the object of the invention to provide a shielding element and a plug connector, which provide a reliable shielding and reduces the assembly complexity and assembly costs, thus saving material, weight and material costs.

SUMMARY OF THE INVENTION

It is contemplated to provide a shielding element with a hollow-cylindrical base body, which has internal spring elements at a first end of the hollow-cylindrical base body. These spring elements establish electrical contact with a shielding of a mating connector. For making contact with the shielding of the mating connector, which is connected, for example, to a cable and to a shielding of this cable, the mating connector usually has, for example, a ring-shaped element that is connected to the shielding of the mating connector or that forms the shielding of the mating connector.

Furthermore, the shielding element may be electrically conductively connected at a second end of the hollow-cylindrical base body to a housing of an electrical assembly, for example a main or auxiliary unit in a vehicle.

For this purpose, the shielding element has at the second end of the hollow-cylindrical base body a plurality of tabs, which are arranged along the circumference of the hollow-cylindrical base body. These tabs have a bend which divides each tab into two sections, for example. The respective first section of a tab extends in an extension of the lateral surface of the hollow-cylindrical base body, while the respective second section of a tab is arranged radially protruding outwards at an angle from the hollow-cylindrical base body after bending. This angle may be in a range from 60 degrees to 130 degrees and may be 90 degrees, for example. This angle is formed between a second section of a tab and the hollow-cylindrical base body.

In an alternative embodiment of the shielding element, the bend may be arranged directly at the start of the tab. i.e. at the transition between the lateral surface of the hollow cylindrical base body and the tab itself, so that the first section is therefore omitted.

In any case, several tabs are arranged along the circumference of the hollow-cylindrical base body, which are at least partially arranged so as to point radially outward or away from the longitudinal axis of the hollow-cylindrical base body. These tabs have the function of a contact element or a contact spring and produce the electrically conductive connection between the shielding element and a housing of an electrical assembly.

Furthermore, at least some adjacent tabs may be arranged at equal distances from one another. Such a regular arrangement of the adjacent tabs is not mandatory and can be interrupted.

The tabs may each have a bead arranged in the area of their bend. These beads, which represent channel-shaped depressions, are preferably each arranged transversely to the longitudinal extension of the bent tabs. These beads form the contact surfaces of the tabs or contact springs, which bear against the housing of the electrical assembly or are brought into contact by a corresponding arrangement of the shielding element.

Furthermore, the shielding element may be arranged in a connector housing surrounding the shielding element. For example, in order to provide a detachable plug connection of a current-carrying cable with an electrical assembly, plug connections consisting of two parts are used, which have a plug connector and a mating connector.

While the shielding element is arranged, for example, in a connector or connector housing that is firmly connected to the housing of the electrical assembly, the cable is connected to a mating connector. By inserting the mating connector into the connector housing, a detachable electrically conductive connection is established between the current-carrying cable and an electrical load arranged in the housing of the electrical assembly. Such detachable connections can have means which, for example, allow the mating connector to snap into place in the connector housing and thus prevent this connection from being unintentionally released.

Furthermore, a contact carrier may be arranged in the shielding element arranged in the connector housing and surrounded by it. This contact carrier may have, for example, one, two or more electrical contacts, which ensure transmission of current between the power-supplying cable and the electrical load. In addition, the contact carrier may have additional contacts that can be used, for example, to transmit status signals and/or control signals or which can be used to signal a proper and secure connection between the mating connector and the plug connector.

Furthermore, the hollow-cylindrical base body of the shielding element may have at its first end means for positioning the hollow-cylindrical base body in the connector housing. These positioning means allow a desired or prescribed positioning of the shielding element In the connector housing. In addition, the assembly complexity is reduced with the appropriate alignment of the shielding element in the connector housing.

For exact positioning and for maintaining a fixed position, the hollow-cylindrical base body of the shielding element may have means at its second end for rotation-locked positioning of the contact carrier in the hollow-cylindrical base body and/or in the connector housing. In an exemplary implementation, some labs are either not formed on the base body at all or are formed with a greater spacing between two adjacent tabs in the form of gaps.

The contact carrier is formed with corresponding positioning shapes, which are positioned in the gaps when the contact carrier is brought together with the hollow-cylindrical base body. In an alternative embodiment, the connector housing has also cutouts at the locations of the gaps. Thus, the positioning shapes of the contact carrier can be positioned both in the gaps of the hollow-cylindrical base body and in the recesses of the connector housing when assembling such a connector.

In order to establish a secure electrically conductive connection between the shielding element and a housing of an electrical assembly such as a control unit or a main or auxiliary unit, the unit consisting of the connector housing with shielding element and contact carrier may be arranged on the housing of the electrical assembly using fasteners. This arrangement of this unit, also referred to as a connector according to the invention, ensures that the tabs function as a contact element or contact spring and are biased against the housing of the electrical assembly or are axially compressed with the housing so as to permanently establish the electrically conductive connection. Screws or rivets, for example, can be used as fasteners.

A seal may be arranged between the connector housing and the housing of the electrical assembly. This, for example, ring-shaped seal prevents contaminants and moisture from entering the housing of the electrical assembly.

In addition, the connector housing may have a means for positioning the connector housing on the housing of the electrical assembly. This means may be embodied, for example, as a pin, defining the installation position or orientation of the connector housing in relation to the housing of the electrical assembly and enabling simple and error-free assembly.

BRIEF DESCRIPTION OF THE DRAWING

The foregoing features and advantages of this invention will be better understood and appreciated after a careful study of the following detailed description of preferred non-limiting example embodiments of the invention in conjunction with the accompanying drawings, which show in:

FIG. 1 shows a perspective representation of the shielding element 1 according to the invention. This shielding element 1 has a hollow-cylindrical base body 2 with a longitudinal axis 3.

DETAILED DESCRIPTION OF PREFERRED EMBODIMENTS

Spring elements 5 are arranged at a first end 4 of the shielding element 1. These internal spring elements 5 are provided for establishing electrical contact with a shielding of a mating connector, which can be connected to a cable. The mating connector and the cable are not shown in FIG. 1. The internal spring elements 5 are arranged, for example, in groups having each three spring elements 5.

Figure 1:
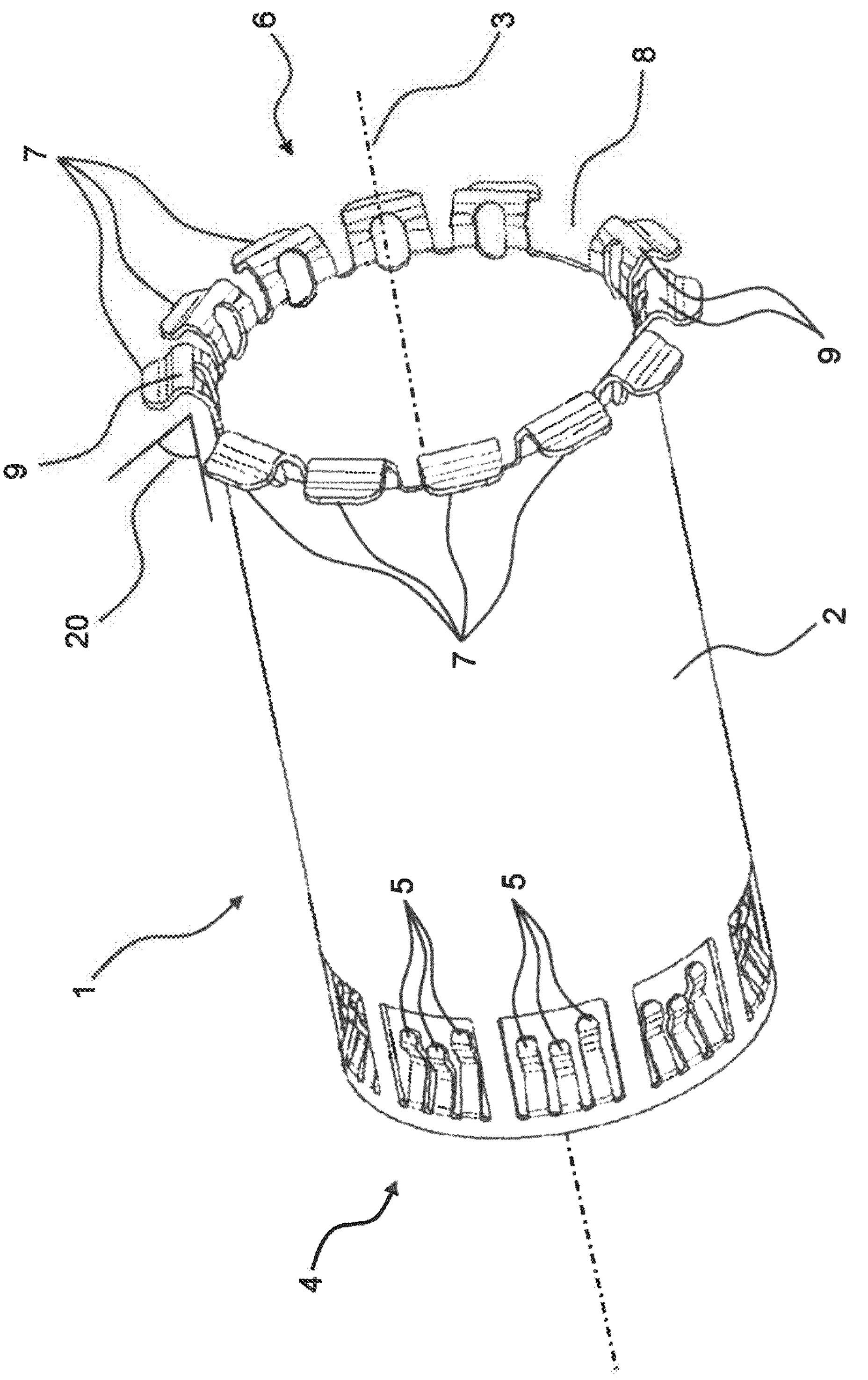
FIG. 1: a perspective view of a shielding element according to the invention.

Tabs 7 according to the invention are arranged at a second end 6 of the shielding element 1. These tabs 7 are spaced apart from one another and are arranged along the circumference of the hollow-cylindrical base body 2. The distance between each two adjacent tabs 7 can be chosen to be identical or different. In the example of FIG. 1, the tabs 7 are arranged in two groups having equal distances from one another in the group. Between the two groups, i.e. at the points where a larger distance was selected between two adjacent tabs 7, a so-called gap 8 is created.

In the example in FIG. 1, the tabs 7 have recesses, which can reduce the weight of the shielding element 1. However, this is not essential for the present invention.

The tabs 7 have a bend, as a result of which the tabs 7 are arranged at least partially protruding radially outwards from a longitudinal axis 3 of the hollow-cylindrical base body 2 or away from the longitudinal axis 3. Such a bend can be made in a range of, for example, 60 degrees to 130 degrees.

The tab 7 can be bent in such a way that the bend divides the tab 7 into two sections. As shown in FIG. 1, the respective first section of a tab 7 runs in an extension of the lateral surface of the hollow-cylindrical base body 2. The respective second section of a bracket 7 after the bend extends at an angle 20 from the hollow-cylindrical base body 2, and protrudes outward or points away from the longitudinal axis 3. In the example of FIG. 1, the angle 20 is shown as approximately 65 degrees. The angle 20 is subtended between the hollow-cylindrical base body 2 and the second section of a tab 7, wherein for example, a mean value is assumed for the second section of the tab 7 in the event that the second section is curved and in particular has a bead 9.

In an alternative embodiment of the shielding element 1 according to the invention, the bend is arranged directly at the beginning of the tab 7, i.e. at the transition between the lateral surface of the hollow-cylindrical base body 2 and the tab 7, thus eliminating the first section. This embodiment is not shown in the figures.

In the area of the bend, the tabs 7 have at least one channel-shaped depression or a bead 9 which is arranged transversely to the longitudinal extent of the bent tabs 7. These beads 9 form the bearing surfaces of the tabs 7, which are brought to bear on a housing 14 of an electrical assembly and produce an electrically conductive connection between the shielding element 1 and the housing 14 of the electrical assembly. Such an electrical assembly and a housing 14 are not shown in FIG. 1.

Figure 2:
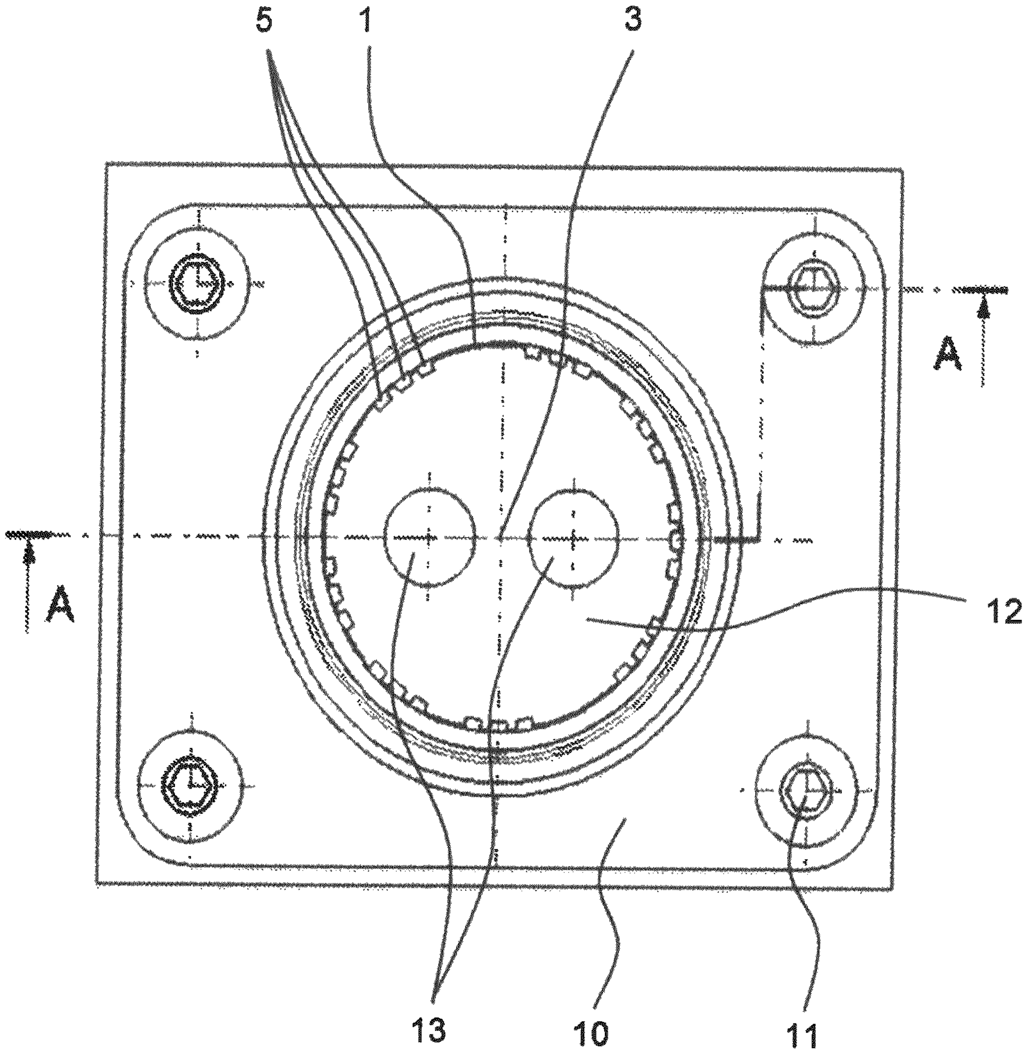
FIG. 2: a plan view of a connector housing with a shielding element according to the invention.

FIG. 2 shows a plan view of a connector housing 10 with a shielding element 1 according to the invention. The shielding element 1 is arranged in a connector housing 10 which surrounds the shielding element 1 and fixes it mechanically. Such a connector housing 10 can, for example, have a rectangular flange, which is arranged using appropriate fasteners 11 on a housing 14, not shown in FIG. 2, of an electrical assembly. These fasteners 11 fix the connector housing 10 with the shielding element 1 to the housing 14 in such a way that the tabs 7 arranged at the second end 6 of the shielding element 1 are pressed against a surface of the housing 14 and establish an electrically conductive connection between the shielding element 1 and the housing 14. In particular, the second section of a tab 7 or the bead 9 incorporated into the tab 7 is pressed against a for example flat surface on the housing 14.

Screws or rivets, for example, can be used as fasteners 11.

A contact carrier 12 is arranged inside the shielding element 1. The contact carrier 12 has two electrical contacts 13, which ensures power transmission between a power-supplying cable and an electrical load. In addition, the contact carrier 12 may have additional contacts, which are not shown in FIG. 2. For example, an unillustrated mating connector connected to the power-supplying cable is plugged into the connector housing 10 for power transmission, as a result of which the electrical contacts 13 are connected to corresponding mating contacts arranged in the mating connector and current flow is enabled to an electrical load arranged in the housing via the cable, the mating contacts and the contacts 13.

Figure 3:
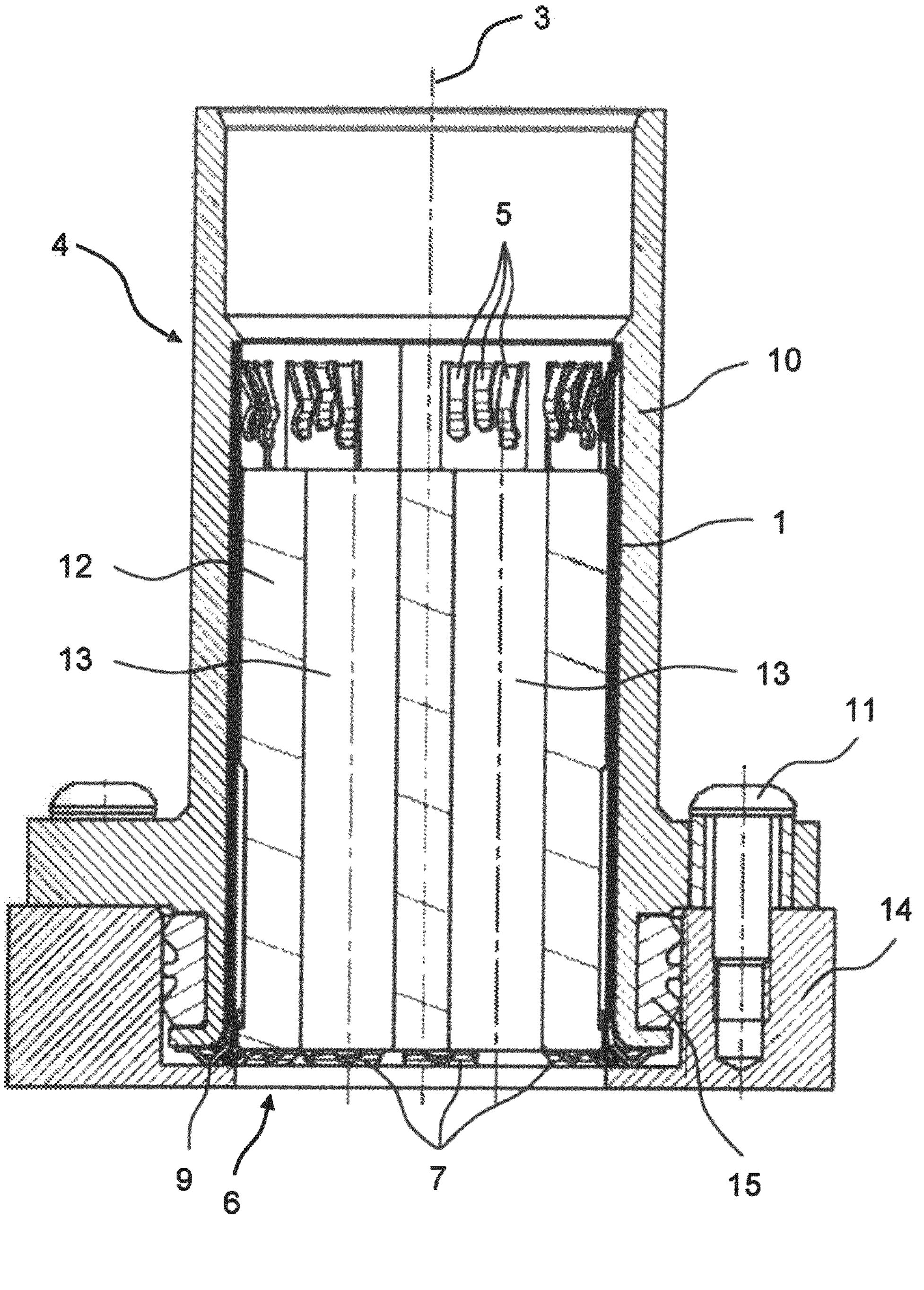
FIG. 3: a sectional view of the connector housing and the shielding element according to the invention along the section line AA shown in FIG. 2, FIG. 4: an enlarged detail of the sectional view shown in FIG. 3, FIG. 5: a perspective view of a connector with the shielding element according to the invention, FIG, 6: another embodiment of the tabs of the shielding element according to the invention.

FIG. 3 shows a cross-sectional view along the section line AA shown in FIG. 2 through the connector housing 10, the shielding element 1 and the contact carrier 12 with its electrical contacts 13.

The shielding element 1 is arranged in the connector housing 10. The spring elements 5 arranged at the first end 4 can also be seen. The connector housing 10 is connected with the fasteners 11 to a housing 14 of an electrical assembly such as a main or auxiliary unit. Through this connection, the tabs 7 arranged at the second end 6 of the shielding element 1 are fastened, in particular with their beads 9, by pressing against a flat surface of the housing 14.

To prevent dirt and moisture from entering the housing 14, a ring-shaped seal 15 is arranged between the housing 14 and the connector housing 10. With this design of the seal 15, the leak-tightness depends on the diameter of the opening in the housing 14 and not, as is the case in the prior art, on a pressing force which is generated by the fasteners 11. Thus, according to the present invention, the leak-tightness is maintained even when the pressing force decreases, for example if the functionality of the fasteners 11 degrades.

FIG. 3 is intended as an example basic illustration and does not show how the electrical contacts 13 are connected to an unillustrated electrical load arranged in the housing 14, which of course is absolutely necessary for supplying power, for example.

Figure 4:
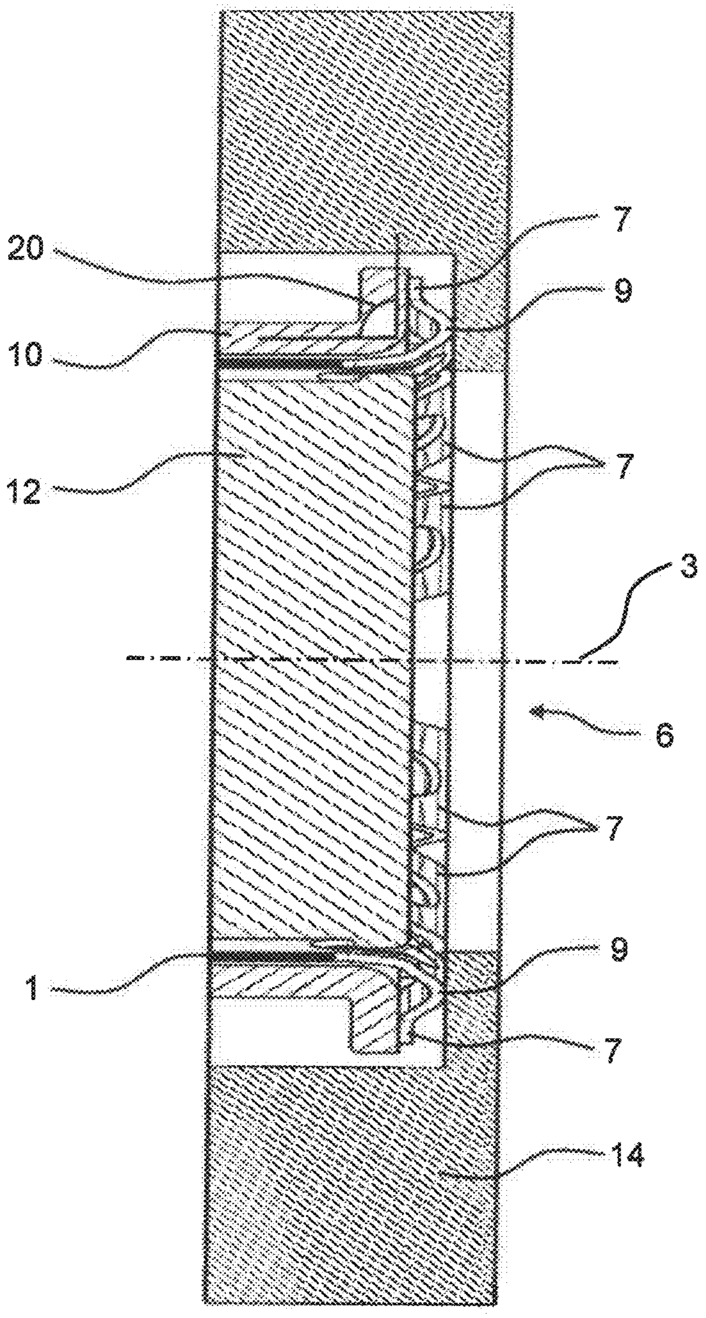

FIG. 4 shows an enlarged detail of part of the sectional view shown in FIG. 3. In this illustration, the area of the transition between the tabs 7 as contact springs of the shielding element 1 and a surface on the housing 14, which is preferably designed as a flat surface, is shown as an enlarged detail. The fasteners 11, the seat 15 and the contacts 13 have been omitted.

It can clearly seen that the tabs 7 bear against the housing 14 in particular with their beads 9 and enable an electrically conductive connection. The design of the tabs 7 with a bead 9 selected in the illustration in FIG. 4 is not mandatory for the present invention. Bending the tabs 7 such that the second section of the tab 7 is angled at an angle 20 of 90 degrees relative to the first section, for example, also makes it possible to provide an electrically conductive connection of the tab 7 to the housing 14.

Figure 5:
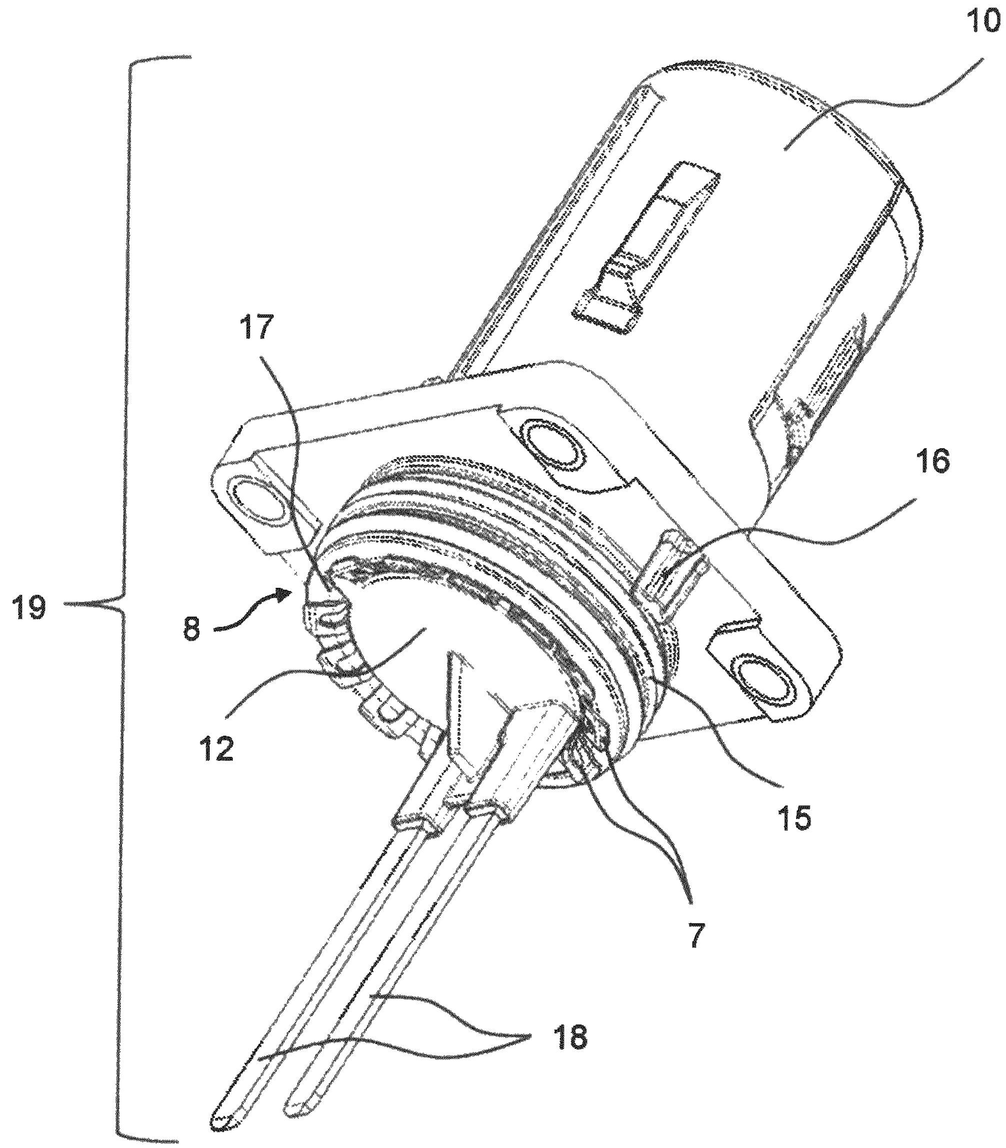

FIG. 5 shows a perspective view of a connector 19 according to the invention with the shielding element 1. The illustrated connector 19 includes the connector housing 10 with the shielding element 1 and the contact carrier 12.

Also visible is the for example rectangular flange of the connector housing 10, which is fastened to an unillustrated housing 14 using unillustrated fastening means 11.

A means 16 designed, for example, as a pin for positioning or aligning the plug connector 19 during assembly on the housing 14 is arranged on this flange.

Also shown is the shielding element 1 introduced into the connector housing 10, with only the tabs 7 protruding from the connector 19.

These tabs 7 are formed with a gap 8, with a positioning shape 17 formed on the contact carrier 12 ensuring a corresponding alignment of the contact carrier 12 upon insertion into the connector housing 10. Thus, the exact position of the contact carrier 12 in the connector housing 10 is specified and the contact carrier 12 is rotation-locked.

In the example in FIG. 5, the unillustrated electrical contacts 13 are extended outwards via the depicted connection wires 18, in order to be able to connect for example an unillustrated load.

In addition, means known from the prior art for aligning and fixing an unillustrated mating connector with the connector 19 on the connector housing 10 can be seen.

By mechanically fixing the plug connector 19 to a housing 14 using the fasteners 11, the conductive tabs 7, which operate as contact springs, are pressed against the housing 14 of an unillustrated electrical assembly, such as a control unit, a main unit or an auxiliary unit in a vehicle, hereby ensuring electrical contact between the mating connector and the plug connector for power and/or signal transmission, including a ground connection for shielding, which is robust and tight.

Figure 6:
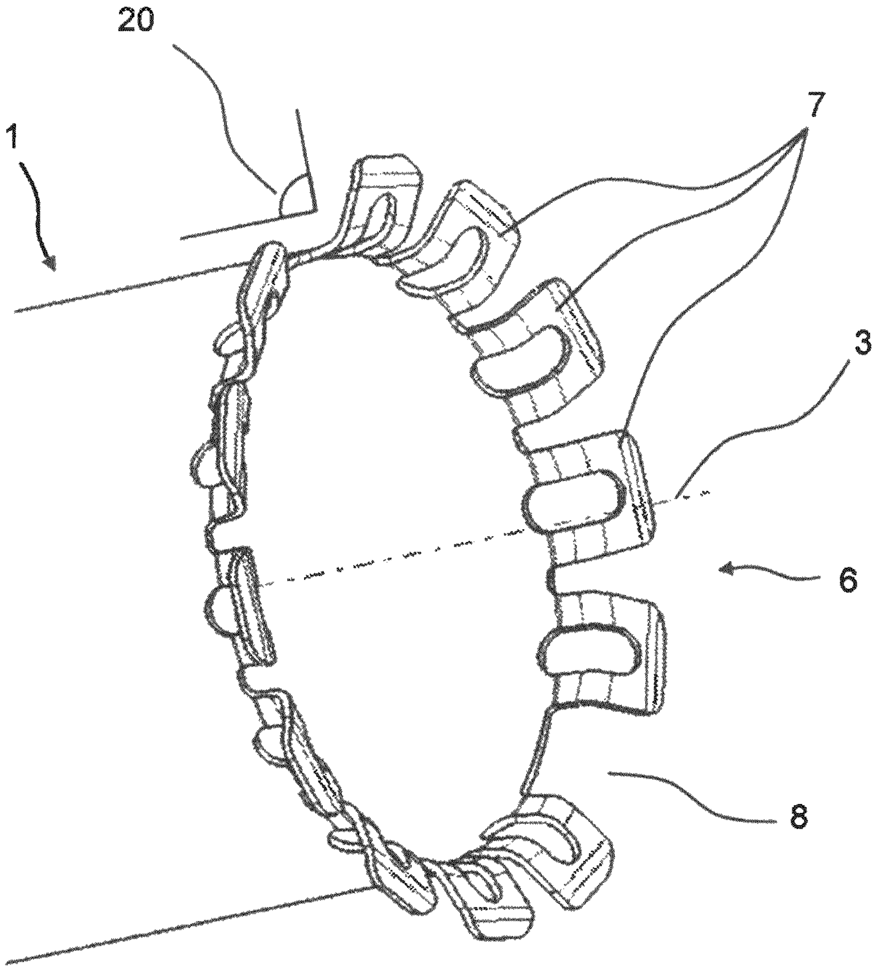

FIG. 6 shows a further exemplary embodiment of the shielding element 1 according to the invention, with the tabs 7 being designed in an alternative configuration. As can be seen in this embodiment, the tabs 7 are designed without a bead 9 and with an angle 20 of approximately 90 degrees.

Figure 7:
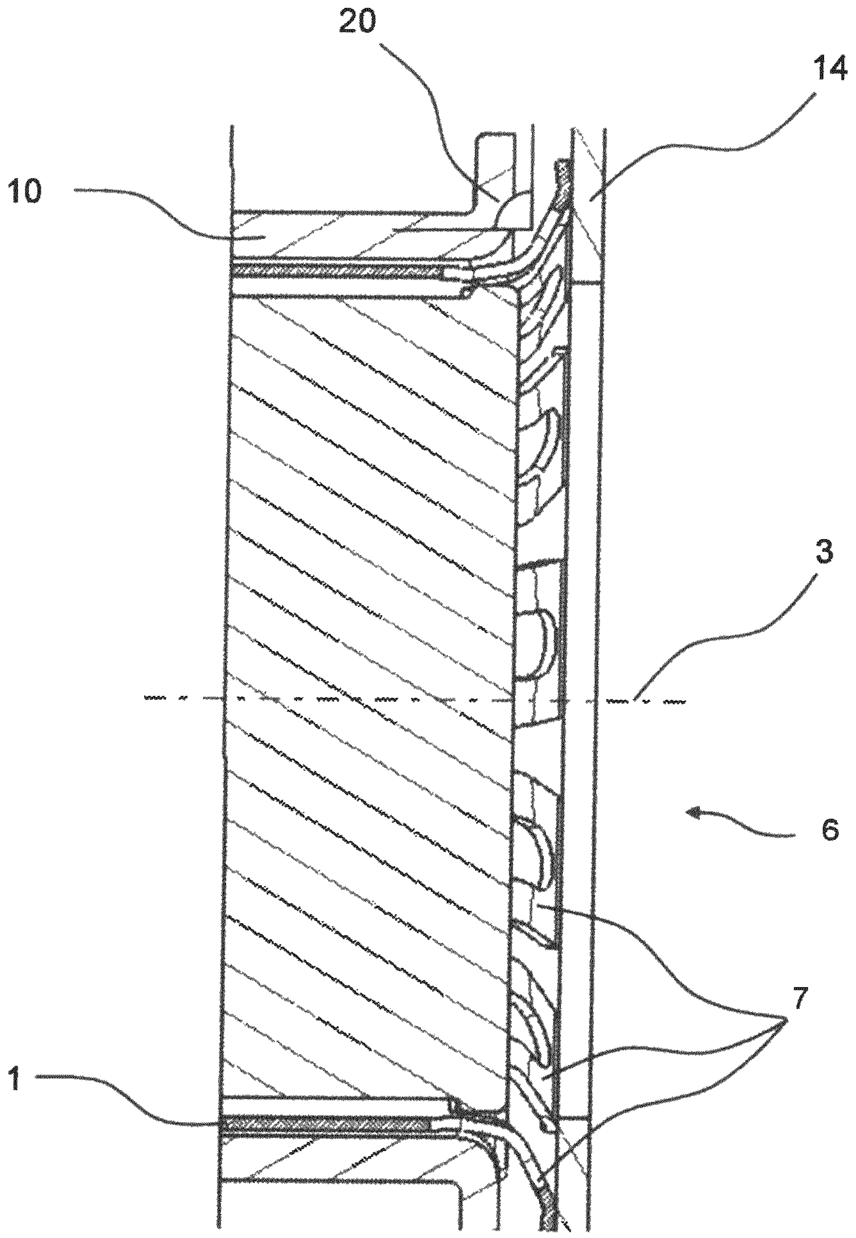
FIG. 7: another sectional view of the connector housing and the shielding element according to the invention according to FIG. 6.

FIG. 7 shows a partial sectional view of the shielding element 1 according to the invention in the configuration according to FIG. 6 in a connector housing 10. The resulting angle 20 between the hollow-cylindrical base body 2 of the shielding element 1 and the second section of a tab 7, which bears against the housing 14, is approximately 90 degrees in this embodiment.

The invention claimed is:

1. A shielding element, comprising a hollow-cylindrical base body having a first end and a second end opposite the first end, inner spring elements arranged at the first end configured to establish electrical contact with a shielding of a mating connector, and a plurality of tabs arranged at the second end along a circumference of the hollow-cylindrical base body in at least one group so as to protrude at least partially radially from a longitudinal axis of the hollow-cylindrical base body, the tabs having a bend and configured to be axially compressed against a flat surface of a housing of an electrical assembly so as to permanently establish an electrically conducting axial connection between the shielding element and the flat surface of the housing of the electrical assembly, with the tabs in the at least one group having identical mutual spacings with respect to one another.

2. The shielding element of claim 1, wherein the tabs each have a bead arranged in the region of the bend and facing the flat surface of the housing.

3. The shielding element of claim 1, wherein the hollow-cylindrical base body comprises at the first end positioning means for positioning the hollow-cylindrical base body in a plug connector housing encompassing the shielding element.

4. The shielding element of claim 1, wherein the hollow-cylindrical base body comprises at the second end a positioning shape configured to lock in a gap between tabs for rotation-locked positioning of a contact carrier in a plug connector housing encompassing the shielding element.

5. A plug connector arranged to form a plug connection with a mating connector, the plug connector comprising a plug connector housing, a contact carrier, and a shielding element arranged between the plug connector housing and the contact carrier, with the shielding element comprising a hollow-cylindrical base body having a first end and a second end opposite the first end, inner spring elements arranged at the first end configured to establish electrical contact with a shielding of a mating connector, and a plurality of tabs arranged at the second end along a circumference of the hollow-cylindrical base body in at least one group so as to protrude at least partially radially outward from a longitudinal axis of the hollow-cylindrical base body, the tabs having each a single bend and a bead arranged transversely to the longitudinal extent of the bent tab and forming bearing surfaces of the tabs when the tabs are axially compressed against a flat surface of a housing of an electrical assembly so as to permanently establish an electrically conducting connection between the shielding element and the flat surface of the housing of the electrical assembly, with the tabs in the at least one group having identical mutual spacings with respect to one another.

6. The plug connector of claim 5, wherein the plug connector housing further comprises a seal and positioning means for positioning the hollow-cylindrical base body in the plug connector housing.

7. The plug connector of claim 5, further comprising fasteners for fastening the plug connector housing with the shielding element and the contact carrier on the housing of the electrical assembly.

8. The plug connector of claim 5, wherein the contact carrier has at least one electrical contact for current or signal transmission.

* * * * *